(12) United States Patent
Nagji

(10) Patent No.: US 6,660,239 B2
(45) Date of Patent: Dec. 9, 2003

(54) METHOD AND SYSTEM FOR TREATING VOLATILE ORGANIC COMPOUNDS USING A CATALYTIC OXIDIZER WITHOUT A BURNER

(76) Inventor: Moez Nagji, 6189 Moores Creek Dr., Summerfield, NC (US) 27358

( * ) Notice: Subject to any disclaimer, the term of this patent is extended or adjusted under 35 U.S.C. 154(b) by 156 days.

(21) Appl. No.: 10/045,298

(22) Filed: Nov. 7, 2001

(65) Prior Publication Data

US 2003/0088139 A1 May 8, 2003

(51) Int. Cl.[7] .................................................. B01J 8/00
(52) U.S. Cl. ........................ 423/245.3; 60/272; 60/299; 422/177
(58) Field of Search ................... 60/272, 299; 422/177; 423/245.1, 245.3

(56) References Cited

U.S. PATENT DOCUMENTS

| | | | |
|---|---|---|---|
| 5,592,811 A | * | 1/1997 | Dodge et al. ................. 60/783 |
| 5,692,458 A | * | 12/1997 | Green ............................ 123/2 |
| 5,718,112 A | * | 2/1998 | Dodge et al. ................. 60/783 |
| 5,832,713 A | * | 11/1998 | Maese et al. ................. 60/783 |
| 6,319,484 B1 | * | 11/2001 | Shore et al. ............. 423/245.1 |

* cited by examiner

*Primary Examiner*—Stanley S. Silverman
*Assistant Examiner*—Maribel Medina
(74) *Attorney, Agent, or Firm*—Anderson Kill & Olick, P.C.; Eugene Lieberstein; Michael N. Meller

(57) ABSTRACT

A catalytic oxidation system and method for the treatment of volatile organic compounds in which VOC-containing gas is preheated in a heat exchanger for raising its temperature before oxidation in a catalytic oxidizer without use of a burner. A reduced portion of the VOC-containing gas is diverted into an internal combustion engine with the exhaust mixed with the preheated VOC-containing gas to further raise the temperature of the mixed gas to a required reaction temperature for oxidation of the VOC-containing gas in the catalyst bed of the catalytic oxidizer. Heat from the catalytic reaction is recovered to assist preheating the VOC-containing gas in the heat exchanger.

3 Claims, 2 Drawing Sheets

METHOD AND SYSTEM FOR TREATING VOLATILE ORGANIC COMPOUNDS USING A CATALYTIC OXIDIZER WITHOUT A BURNER

THE FIELD OF THE INVENTION

This invention relates to a system and method for catalytically oxidizing volatile organic compounds (VOC's) utilizing the exhaust of an internal combustion engine.

BACKGROUND OF THE INVENTION

Controlling air pollution is acknowledged as a nationwide and worldwide concern. A major contributor of air pollution is attributed to the release of volatile organic compounds into the atmosphere. Accordingly, the reduction of VOC emissions is considered an important part of overall pollution control management to improve air quality.

Common VOC's such as pentane, ethanol, methanol, ethyl acetate, hexane, as well as others are produced from manufacturing sites by solvent vaporization or as by-products. Accordingly, in most cases, the production of VOC's are being unavoidably formed and need to be treated or destroyed to satisfy the environmental requirements of most of the developed nations in the world.

Thermal incineration and catalytic oxidation are the most frequently used control methods for destroying VOC's. In the combustion method, waste gas containing VOCs is mixed with natural gas and combusted in a large chamber into which sufficient natural gas is fed to sustain combustion with carbon dioxide and water vapor formed as the primary products of the combustion. Incineration of VOC's requires significant amounts of electricity and natural gas and although some energy can be recovered as heat the operating cost of combustion type devices is high and, as such, is not a cost effective method for treating VOC's.

One method which has been considered in the prior art for offsetting the high operating cost of combustion is to perform the combustion in an internal combustion engine in which the heat of combustion is used to assist in the generation of electricity. This is taught in U.S. Pat. No's.: 5,592,811; 5,718,112 and 5,592,813 respectively. These patents use the conventional combustion principal to thermally incinerate the VOC's in the internal combustion engine while utilizing the output heat of combustion to improve the efficiency of the internal combustion engine for generating electricity. Because of the need for a relatively long residence time to combust VOC gases in an internal combustion engine this process is inherently inefficient without substantial modification of the engine to insure adequate residence time for combustion to occur so as to fully burn the VOC's. The process is also dependent on very high VOC concentrations in the effluent VOC stream. For small plants with VOC emissions substantially below 1000 ppm and particularly for VOC concentration levels below 100 ppm the use of combustion type devices for thermal incineration of the VOC's does not increase the operating efficiency of the combustion device and does not decrease the overall cost of operation.

Catalytic oxidation uses a catalytic bed of metal catalysts such as platinum, palladium, platinum/rhenium, etc., to oxidize the VOCs. Since the catalytic oxidation process requires an operating temperature of around 450 to 750° F. for destruction efficiency of greater than 95% as required by the clean air regulation, it is conventional to use a gas burner to pre-heat the VOC-containing waste gas to the required operating temperature before passage through the catalytic bed. The catalyst inlet temperature required for 95% destruction is dependent on the type of VOC in the stream. A gas burner is expensive to purchase, operate and maintain. The high operating cost is attributable primarily to the supply of natural gas and to the cost of maintenance. In addition, burners cannot be used in many pharmaceutical and chemical plants due to flammable solvents used in such plants. While turbines or reciprocating engines are usually permitted in such plants, gas burners used in the conventional catalytic oxidation unit are not allowed.

A common approach to these problems is installing a single, large-scale waste gas treatment unit in a remote place for an entire facility. Waste gas produced from each individual workstation is transferred through pipelines and consolidated to one gas steam, which is, then, introduced to the waste gas treatment unit. Such centralized waste gas treatment unit operates using a gas burner, a burner safety controller, and a large-scale catalytic oxidation unit for the entire collected waste gas. Although bigger and more expensive burners and larger-scale catalytic oxidation units are used for such centralized systems, overall cost thereof is much less than those for individual installations at several work units. The economic benefit of the centralized waste treatment system is mainly derived at the expense of operation of individual workstations. However, such centralized system require continuous operation even when only few workstations are in operation and for maintenance or repair, the entire factory has to be taken off-line. Consequently, the economics of catalytic oxidation is primarily attributable to the operational cost of the gas burner.

SUMMARY OF THE INVENTION

It has been discovered in accordance with the present invention that catalytic oxidation can be used for the destruction of volatile organic compounds in a waste effluent even at very low VOC concentration levels without the need for a gas burner. This is accomplished by utilizing the exhaust from a conventional internal combustion engine as a heat source to achieve the optimum temperature for the catalytic oxidation of the VOC's while simultaneously employing the electrical power generated from the internal combustion engine to offset the cost of fuel for operating the internal combustion engine. Moreover, since an appropriate optimum temperature for the inlet gas for the catalytic oxidation can be maintained by re-cycling the heat from the catalytic oxidation to a heat exchanger through which at least a substantial portion of the waste VOC effluent is passed the overall thermal energy required from the exhaust of the internal combustion engine can be significantly reduced. Consequently, substantial reduction of operating cost of such waste gas treatment units can be achieved. Furthermore, since this invention does not require a gas burner overall installation and operating costs are substantially reduced. Generally, the burner used in the conventional method requires specialized maintenance in order for effective and prompt operation, which influence the uptime of the catalytic oxidation process. This invention, however, can ensure the uptime of the oxidation process without special care because operation of a power generator are usually guaranteed by the manufacture with greater than 95% uptime. This invention also reduces costs related to VOC flow control devices such as stream direction control values and pipes since the catalytic oxidation units need to be in relative close proximity to the source generating VOC.

The method of the present invention for destroying volatile organic compounds (VOCs) broadly comprises:

passing all or a significant portion of an effluent VOC containing gas stream through a heat exchanger for preheating the VOC containing gas stream;

mixing said preheated VOC-containing gas stream with the exhaust gas from an internal combustion engine operating from a fuel supply to raise the temperature of the mixed gas to a temperature above at least about 500° F.;

passing said mixed gas through a bed of catalysts for catalytically oxidizing said VOC's; and directing the output from said bed of catalysts to said heat exchanger.

DESCRIPTION OF THE PREFERRED EMBODIMENTS

Figure 1:
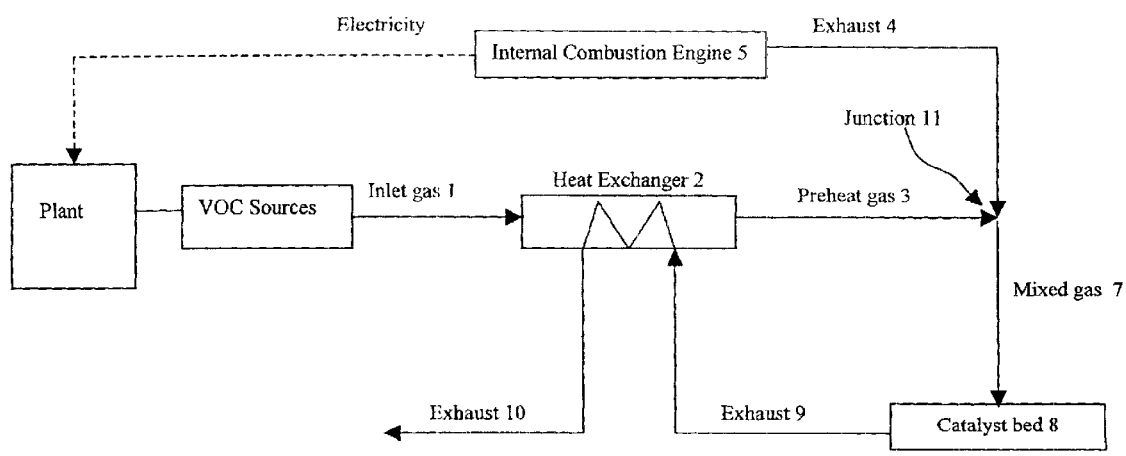
FIG. 1. is a schematic block diagram of the catalytic oxidation process of the invention.

With reference to FIG. 1, inlet gas stream 1 is an effluent gas stream from a small manufacturing, restaurant or plant facility in which the gas stream contains VOC's typically at a low temperature of typically about 150° F. and more generally between about 75° F. and 200° F. The flow rate of the inlet gas stream 1 lies in a range of between above 300 cfm and below 10,000 cfm. The concentration of VOC's in the inlet gas stream 1 may be below 2000 ppm and for very small manufacturing plants or individual workstations in a plant facility is generally below 500 ppm and may be as low as between 10–50 ppm. To preheat the inlet gas stream 1, it is passed through a conventional heat exchanger 2 forming a preheated exhaust stream 3 at a temperature of about three times the inlet temperature, e.g. 450° F. which is then mixed with the exhaust 4 from a conventional internal combustion engine 5. The heat exchange is arranged for counter current flow between the inlet gas 1 and exhaust 9. Any conventional internal combustion engine 5 may be selected for use in accordance with the present invention based upon cost and characteristics of exhaust temperature and flow conditions. The internal combustion engine 5 may operate using an externally fed fuel supply of natural gas, propane, diesel etc. The output exhaust 4 of the conventional internal combustion engine 5 is generally at a temperature of between about 900° F. and 1300° F. The preheat exhaust gas stream 3 is mixed with the output exhaust 4 to achieve a mixed or consolidated gas stream 7 at a temperature between about 550° F. and 750° F. before passing the mixed gas stream 7 through a catalyst bed 8 which will catalytically oxidize the VOCs in the mixed gas stream 7. Catalytic oxidation is an exothermic process which generates heat depending on the amount of hydrocarbons in the stream during its operation. The heat generated during the catalytic process is recovered and re-used to preheat the inlet gas stream 1. Accordingly, the exhaust 9 from the catalyst bed 8 is at a higher temperature than the mixed gas stream 7 and is fed back through into the heat exchanger 2. The hot air exhaust 10 is directed into the atmosphere.

By controlling the flow rate of the preheat gas stream 3 and the output exhaust 4 at the junction 11 a desired temperature can be achieved matched to oxidize a given VOC in the catalyst bed 8 within the temperature range of 550° F. and 750° F. Such flow control may be obtained by employing a separate flow rate controller at junction 11. However this is more desirably obtained by simply mixing the two gas steams together without a flow rate controller or by diverting a partial stream 12 from the inlet gas stream 1 into the internal combustion engine 5 as shown in FIG. 2.

Figure 2:
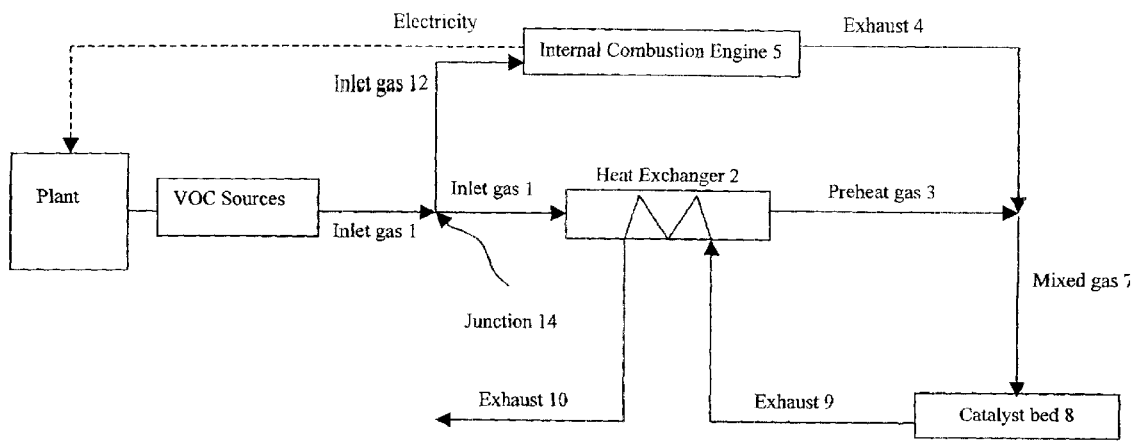
FIG. 2. is a modified schematic block diagram of the catalytic oxidation process of FIG. 1 in which a partial flow of the effluent VOC containing gas stream is passed through an internal combustion engine to control the flow of inlet gas introduced to the catalytic oxidation.

In FIG. 2, the flow rate controls for the appropriate reaction temperature can be controlled either at junction 11, junction 14 or both or without flow control allowing the carburator (not shown) in the internal combustion engine 5 to accept only a limited amount of the inlet gas stream 1 for complete combustion. Otherwise the operation of FIG. 2 is substantially the same as the operation in FIG. 1.

This invention allows installation of a catalytic oxidation unit sized to the needs of the site where VOC's are generated to substantially offset the electrical power costs for operating the site. Generally, small individual installations are not economically plausible where the VOC concentration level is relatively small. Since each catalytic oxidation unit can be independently operated, so can each work site.

The following are examples in which the system and method of the present invention is economically advantageous.

EXAMPLE 1

Assume a typical industrial printing plant having several presses in which each press requires certain electric power to run the press and certain amount of natural gas to provide heat to dry the ink. VOCs will be produced as an exhaust from each such press. Conventionally, the VOC exhausts are combined from all presses and directed to a centralized waste gas treatment unit. The present invention allows installation of a small generator for each press or presses to provide the necessary temperature for the catalytic oxidation of the waste gas so as to enable individual oxidization process for each press or presses and for simultaneously generating the needed electricity to operate the presses.

Overall temperature control of the present invention is mainly obtained by controlling the percentage of the inlet gas stream diverted into the internal combustion engine. The diverted partial stream of inlet-VOC-gas is incinerated along with the engine fuel. The principle function for diverting a portion of the VOC gas to the internal combustion engine is to control the temperature at the mixed gas junction 11.

Table 1 and 2 show temperatures and flow rates of each gas stream in FIGS. 1 and 2 when typical internal combustion engines are used for the present invention. For example, when Caterpillar internal combustion engine is used for the system in FIG. 1 (Table 1), VOC containing gas 1 (110° F. and 1350 m$^3$/hr) is preheated to 450° F. in the heat exchanger 2. Then, this preheated gas 3 can be heated to 558° F. by simply mixing exhaust 4 (1036° F. and 306 m$^3$/hr). In obtaining the resulting temperature, heat capacity of each gas stream is presumed to be same. The mixed gas stream 7, which now has temperature high enough for the catalytic process, is subjected to the catalyst bed 8. Due to the exothermic reaction of the catalysts, the temperature of exhaust 9 would be dependent on the concentration of VOCs in the mixed gas stream 7. In the current example, ten degree elevation is assumed.

Using the same internal combustion engine, higher temperature of the mixed gas 7 can be obtained under the system in FIG. 2. In the Table 2, some of VOC containing gas stream 1 is directed to the internal combustion engine 5 so that only 1044 m$^3$/hr of stream 11 enters the heat exchanger 2 in Caterpillar example. Then, this gas stream 11 (110° F. and 1044 m$^3$/hr) can be heated to 450° F. in the heat exchanger 2 and is combined with exhaust 4 (1036° F. and 306 m$^3$/hr). The temperature of the resulting mixed gas 7 would be 583° F., which is high enough for the catalytic oxidation.

EXAMPLE 2

A restaurant exhaust from various cooking devices can be treated economically with the invention. A typical fast food burger restaurant may use 75–125 kwh of electric power. The exhaust from the hood containing VOC is directed either as shown in FIG. 1 or FIG. 2. Various power generator can be used. The attached chart shows four typical generators, the internal combustion engines, and one micro turbine. The flow to the generator can be adjusted to allow the desired temperature for the catalyst process.

TABLE 1

Flow rate and temperature of gas stream in FIG. 1 for typical internal combustion engines.

| Internal combustion Engine (model) | | Gas Stream | | | | | |
|---|---|---|---|---|---|---|---|
| | | 1 | 3 | 4 | 7 | 9 | 10 |
| Caterpillar (G3306) | Flow rate (m$^3$/hr) | 1350 | 1350 | 306 | 1656 | 1656 | 1656 |
| | Temperature (° F.) | 110 | 450 | 1036 | 558 | 568 | 291 |
| Cummings (GGKD) | Flow rate (m$^3$/hr) | 1350 | 1350 | 500 | 1850 | 1850 | 1850 |
| | Temperature (° F.) | 110 | 450 | 1100 | 626 | 636 | 388 |
| Elliot (150RN) | Flow rate (m$^3$/hr) | 1350 | 1350 | 500 | 1850 | 1850 | 1850 |
| | Temperature (° F.) | 110 | 450 | 1100 | 626 | 636 | 388 |
| Capstone (60) | Flow rate (m$^3$/hr) | 1350 | 1350 | 853 | 2203 | 2203 | 2203 |
| | Temperature (° F.) | 110 | 450 | 649 | 527 | 537 | 329 |

TABLE 2

Flow rate and temperature of gas stream in FIG. 2 for typical internal combustion engines.

| Internal combustion Engine (model) | | Gas Stream | | | | | | | |
|---|---|---|---|---|---|---|---|---|---|
| | | 1 | 11 | 3 | 4 | 7 | 9 | 10 | 12 |
| Catepillar (G3306) | Flow rate (m$^3$/hr) | 1350 | 1044 | 1044 | 306 | 1350 | 1350 | 1350 | 306 |
| | Temp. (° F.) | 110 | 110 | 450 | 1036 | 583 | 593 | 330 | 110 |
| Cummings (GGKD) | Flow rate (m$^3$/hr) | 1350 | 850 | 850 | 500 | 1350 | 1350 | 1350 | 500 |
| | Temp. (° F.) | 110 | 110 | 450 | 110 | 691 | 701 | 487 | 110 |
| Elliott (150RN) | Flow rate (m$^3$/hr) | 1350 | 850 | 850 | 500 | 1350 | 1350 | 1350 | 500 |
| | Temp. (° F.) | 110 | 110 | 450 | 110 | 691 | 701 | 487 | 110 |
| Capstone (60) | Flow rate (m$^3$/hr) | 1350 | 497 | 497 | 853 | 1350 | 1350 | 1350 | 853 |
| | Temp. (° F.) | 110 | 110 | 450 | 649 | 576 | 586 | 461 | 110 |

What is claimed is:

1. A method for destroying volatile organic compounds (VOCs) comprising the steps of:

passing all or a substantial portion of an effluent VOC containing gas stream through a heat exchanger for preheating the VOC containing gas stream;

mixing said preheated VOC-containing gas stream with the exhaust gas from an internal combustion engine operating from an independent fuel supply to raise the temperature of the mixed gas to a temperature in a range from about 550° F. to 750° F.;

passing said mixed gas through a catalyst bed for catalytically oxidizing said VOC's; and directing the output from said catalyst bed to said heat exchanger to recover the heat of reaction in said catalyst bed for assisting said heat exchanger to raise the temperature of the inlet VOC containing gas.

2. A method as defined in claim 1 further comprising the step of diverting a portion of said VOC containing gas to said internal combustion engine sufficient to adjust the temperature of said mixed gas to a temperature in said range substantially optimized for the VOC's to be oxidized.

3. An integrated system for destroying volatile organic compounds (VOCs) from a plant facility waste effluent by catalytic oxidation through a catalyst bed utilizing an internal combustion engine while simultaneously generating electrical energy to offset the cost of operation of said internal combustion engine comprising:

a heat exchanger connected to receive the VOC containing gas from said waste effluent to preheat said VOC containing gas;

means for diverting a portion of said VOC containing gas to said internal combustion engine;

means for feeding a mixture from the exhaust from said internal combustion engine and said preheated VOC-containing gas at a temperature in a range from about 550° F. to 750° F. to said catalyst bed for catalytically oxidizing VOC's in said VOC-containing gas; and means for directing the output from said catalyst bed to said heat exchanger for assisting the heat exchanger to preheat the VOC-containing gas.

* * * * *